C. BOKALRUD.
MILKING MACHINE.
APPLICATION FILED JUNE 9, 1911.
1,017,502.
Patented Feb. 13, 1912.
3 SHEETS—SHEET 1.
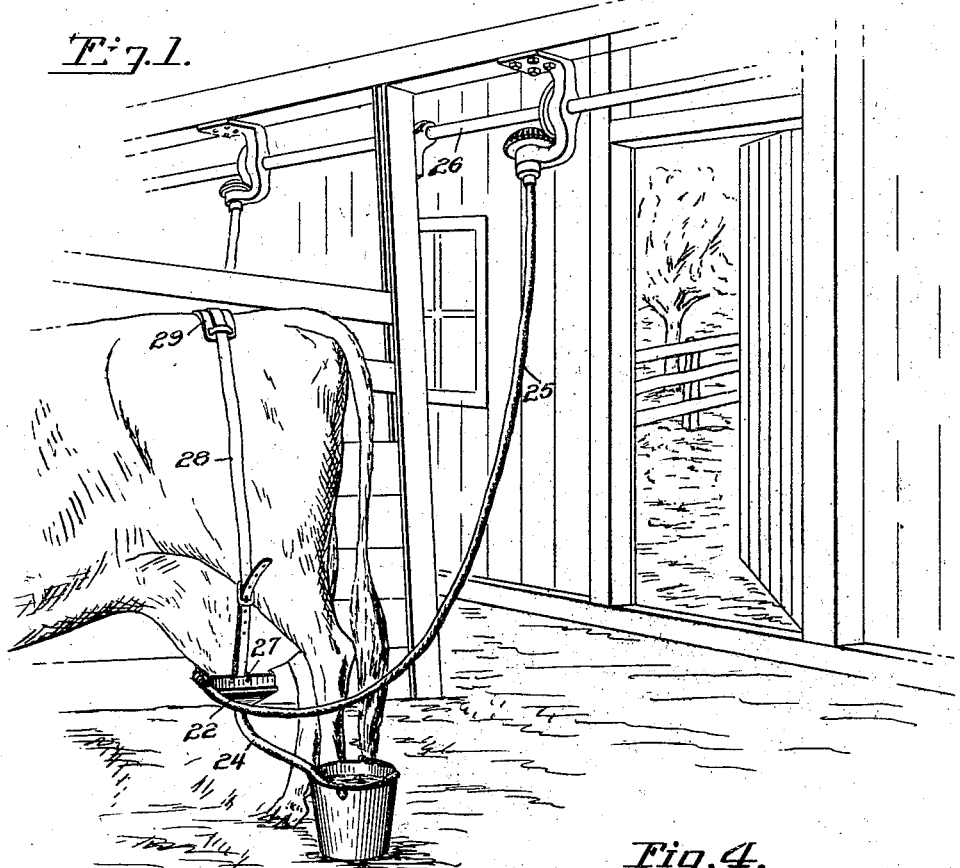
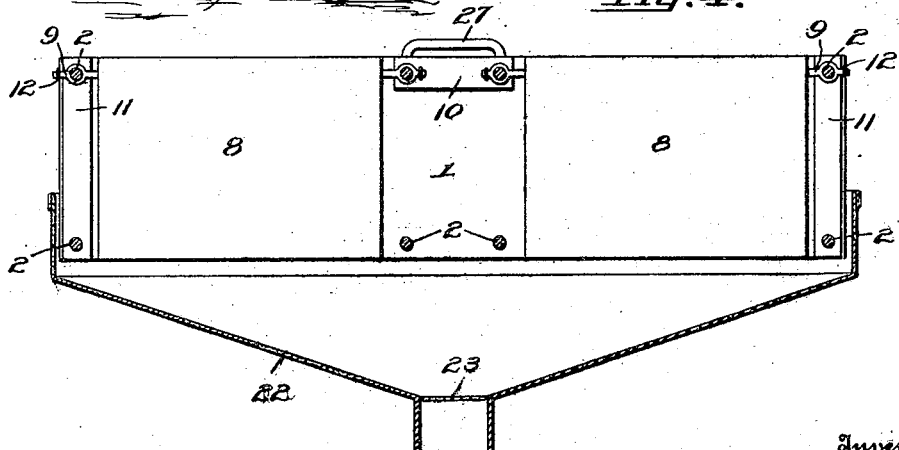
Witnesses
F. C. Gibson,
V. B. Hillyard.
Inventor
Christopher Bokalrud
By Victor J. Evans
Attorney

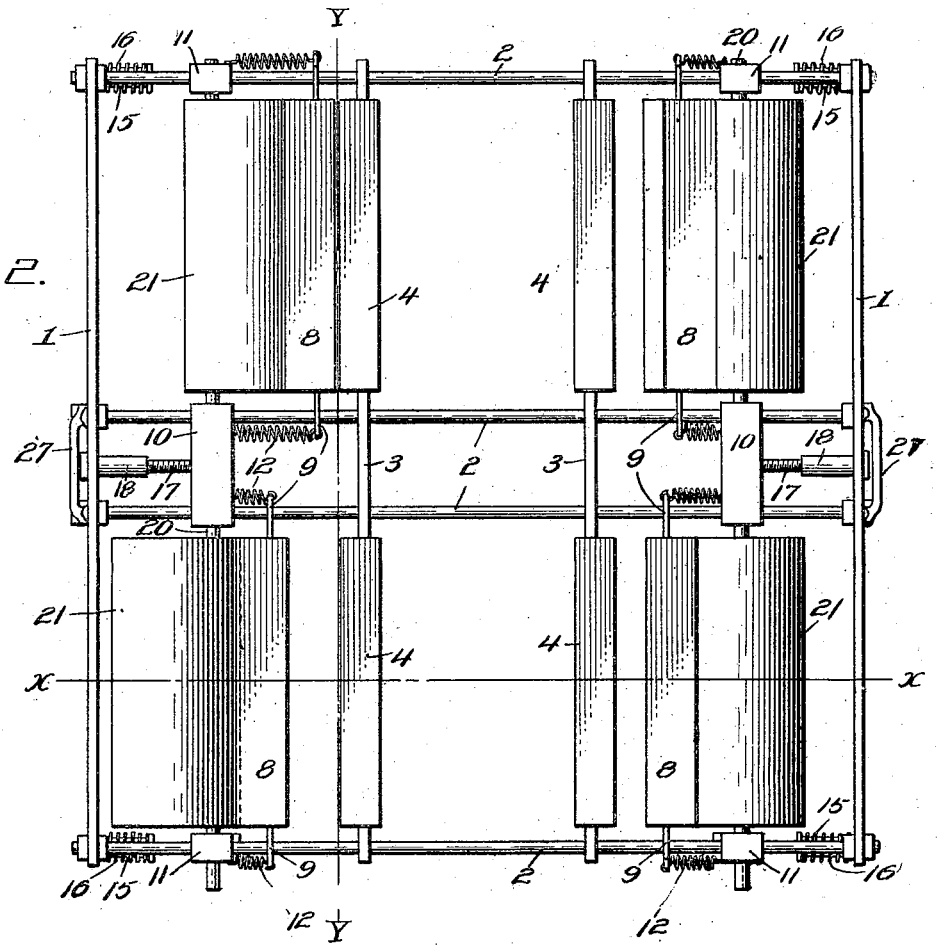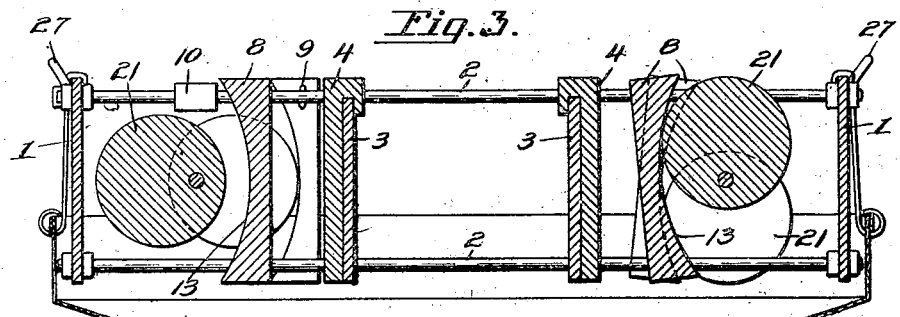

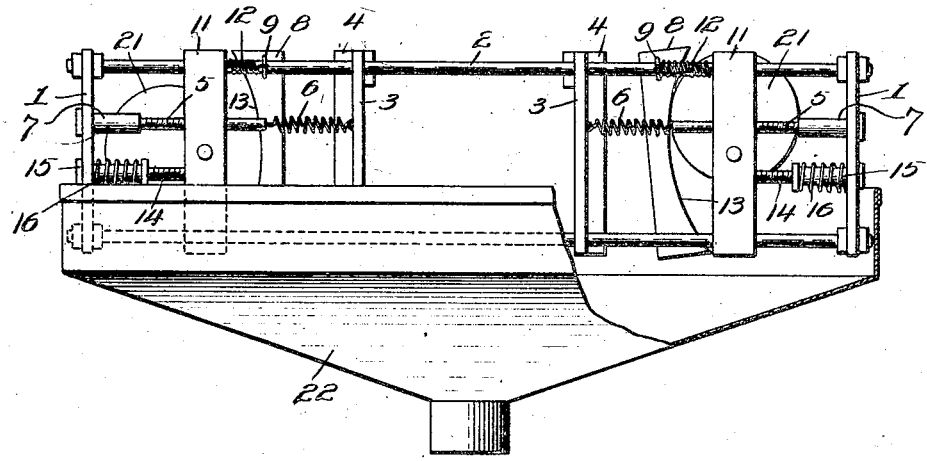
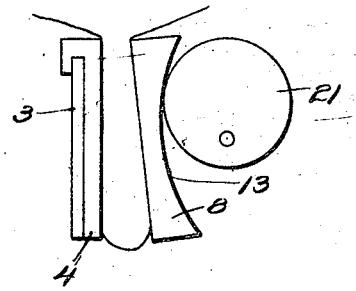
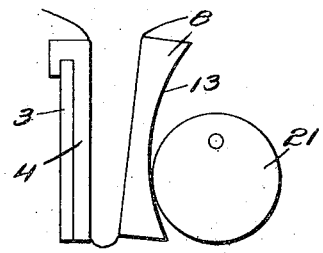

UNITED STATES PATENT OFFICE.

CHRISTOPHER BOKALRUD, OF McINTOSH, SOUTH DAKOTA.

MILKING-MACHINE.

1,017,502.  Specification of Letters Patent.  Patented Feb. 13, 1912.

Application filed June 9, 1911. Serial No. 632,160.

*To all whom it may concern:*

Be it known that I, CHRISTOPHER BOKALRUD, a citizen of the United States, residing at McIntosh, in the county of Corson and State of South Dakota, have invented new and useful Improvements in Milking-Machines, of which the following is a specification.

The present invention provides a machine for greatly facilitating the milking operation when collecting the fluid and enables the work to be quickly and effectively performed without discomfort to the cow or producing any injurious results from over pressure or abrasive action.

The invention provides a machine embodying pressure plates which are yieldably supported and mounted to subject the teats to a gradual pressure from base to point to insure the removal of the fluid therefrom at each operation without affording opportunity for the same to pass back into the udder.

The invention further provides novel mountings for the pressure plates and actuating means therefor of peculiar structure whereby the pressure is gradually applied to the plates from top to bottom.

The invention consists of the novel features, details of construction and combination of parts, which hereinafter will be more particularly set forth, illustrated in the accompanying drawings, and pointed out in the appended claims.

Referring to the drawings, forming a part of the specification, Figure 1 is a detail view, showing the machine in all its essential parts. Fig. 2 is a top plan view of the machine. Fig. 3 is a longitudinal section on the line $x$—$x$ of Fig. 2. Fig. 4 is a transverse section on the line $y$—$y$ of Fig. 2. Fig. 5 is a side view partly in section. Fig. 6 is a detail view, showing the initial operation of the eccentric whereby the upper edges of the pressure plates are brought together. Fig. 7 is a view similar to Fig. 6, showing the position of the parts when the eccentric is about to release the pressure plates.

Corresponding and like parts are referred to in the following description, and indicated in all the views of the drawings, by the same reference characters.

The machine embodies a frame which comprises end plates 1 and tie rods 2, the latter connecting the end plates 1 and having their end portions threaded and provided with pairs of nuts between which the end plates are secured. Two plates 3 are mounted upon the tie rods and are free to move thereon and constitute the inner pressure plates. A covering 4 is applied to the outer sides of the plates 3 and may consist of rubber or other yieldable material to prevent injurious pressure. The covering 4 has a hook at its upper edge which engages over the plate so as to hold the cover in place and admit of its removal for sanitary purposes or to be readily replaced as occasion may require. Yieldable means connect the plates 3 with the plates 1 and consist of threaded rods 5, springs 6 and set tubes 7, the latter passing through openings formed in the plates 1 and receiving the outer threaded ends of the rods 5, the springs 6 connecting the inner ends of the threaded rods with the pressure plates 3. Other pressure plates 8 are loosely mounted upon the upper tie rods, their lower ends being free. Screw eyes 9 are let into the ends of the pressure plates 8 and are mounted upon the upper tie rods and are connected with blocks 10 and 11 by means of springs 12. The blocks 11 are loose upon the upper and lower side tie rods, whereas the blocks 10 are loose upon the two upper intermediate tie rods. The springs 12 are helical and contractile in nature so as normally to hold the pressure plates 8 away from the pressure plates. The outer sides of the pressure plates 8 are made concave, as indicated at 13. The outer pressure plates 8 may be of rubber or any other meterial presenting a yieldable surface to prevent injury when the machine is in operation.

The side blocks 11 are adjustable and yieldably connect with the end plates 1. The yieldable and adjustable connections between the blocks 11 and the end plates 1 consist of threaded rods 14, set tubes 15 having screw thread connection with the rods 14 and helical springs 16 mounted upon set tubes 15 and confined between stop flanges at the inner ends of said set tubes and the end plates 1. The springs 16 are expansible and adapted to be compressed when the blocks 11 are pressed outwardly. The threaded rods 5 pass loosely through the blocks 11. The blocks 10 have a relative horizontal arrangement and are yieldably and adjustably connected with the end plates 1 in a manner similar to the blocks 11. Threaded rods 17 and set tubes 18 form the connecting means between the blocks 10 and the end plates 1. It will be understood that the outer pressure plates 8 are yieldably connected with the blocks 10 and 11 and said blocks in turn are both yieldably and adjustably connected with the end plates.

Shafts 20 are mounted in the blocks 11, two shafts being employed and arranged near opposite ends of the frame. Two eccentric rolls 21 are fastened to each shaft 20 and have a diametric arrangement whereby each comes into play during one half of each revolution of the shaft. There are practically four pressure devices and four eccentric rolls, each of the pressure devices being designed for coöperation with a teat during the milking operation.

The shafts 20 are adapted to be rotated at a uniform speed in opposite directions, thereby moving the outer pressure plates 8 inwardly in successive order. As the shafts 20 rotate the eccentric rolls first engage with the upper portion of the outer pressure plates and move the same inward, thereby gripping the base of the teat between the inner and outer pressure plates and as the eccentric continues its rotation the line of pressure upon the outer plate moves from top to bottom, thereby gradually bringing the pressure plates together so as to compress the teat from base to point to insure expressing all the fluid therefrom. After the eccentric clears the pressure plate the latter moves outward by the action of the springs 12, thereby releasing the teat which is permitted to fill before the next movement of the outer pressure plate. It is noted that the operation is by a gradual compressive action and that the teat is not liable to injury resulting from abrasive action by the operation of a part moving thereover. The pressure plates simply move inward and outward, the rubbing action being between the eccentric roll and the outer pressure plate, the disposition of the parts being such as to bring the upper edges of the pressure plates together to compress the base portion of the teat and subsequently to gradually bring the plates together to force the fluid from the teat. By compressing the base portion of the teat the fluid is prevented from being forced backward into the udder.

The framework is adapted to be closed at its bottom and sides by means of a cover 22, which preferably slopes to a central point at which a discharge opening is formed. A strainer 23 covers the discharge opening and a tube 24 leads from the opening in the bottom of the cover to convey the milk to a convenient point of discharge. For operating the shafts 20 a flexible shaft 25 is connected to each and extends to a counter shaft 26, which is driven by any suitable source of power, the flexible shaft 25 being connected by miter gearing or in any manner to the counter shaft 26.

The framework of the machine is provided at opposite ends with handles 27 to which the ends of a back strap 28 are connected, said back strap being passed over the back of the cow in such a manner as to support the machine in proper position for the milking operation. A pad 29 is interposed between the back of the animal and the strap 28.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. A milking machine comprising pressure plates, yieldable supporting means for the pressure plates, means for relatively adjusting the yieldable supporting means to properly position the pressure plates and to regulate the space between them, a compressing device for advancing the pressure plates, and yieldable supporting means for the pressing means.

2. In a milking machine, the combination of a pair of pressure plates, yieldable supporting means therefor, one of the pressure plates having a concave recess in its outer side, and an eccentric compressing device to sweep across the concave depression of the pressure plates to gradually move the same toward the opposite pressure plate for gradually compressing the teat from base to point.

3. In a milking machine, the combination of a pair of pressure plates, slidably mounted blocks, yieldable connections between one of the pressure plates and the slidable blocks, yieldable and adjustable connecting means between the other pressure plate and the framework, other yieldable and adjustable connecting means between the slidable blocks and the framework, a shaft mounted in the said blocks, and an eccentric mounted upon said shaft and adapted to engage the adjacent pressure plate for gradually moving the same toward the companion pressure plate.

4. A milking machine comprising a framework embodying end plates and tie rods, a pressure plate mounted upon the tie rods, yieldable and adjustable connecting means between said pressure plate and an end plate of the frame, outer pressure plates mounted upon the tie rods, blocks slidably mounted upon the side tie rods, yieldable connections between said blocks and the outer ends of the adjacent pressure plates, a second block slidably mounted upon the intermediate tie rods, yieldable connecting means between the inner ends of the pressure plates and the intermediate slide block, yieldable and adjustable connecting means between the intermediate and side blocks and the adjacent end plate of the frame, a shaft mounted in the side blocks, and eccentrics mounted upon said shaft and having a diametric arrangement to alternately engage the outer pressure plates.

In testimony whereof I affix my signature in presence of two witnesses.

CHRISTOPHER BOKALRUD.

Witnesses:
ALERT EIDE,
THEO. E. KIRKLAND.

---

Copies of this patent may be obtained for five cents each, by addressing the "Commissioner of Patents, Washington, D. C."